(12) United States Patent
Pletcher et al.

(10) Patent No.: US 9,582,513 B2
(45) Date of Patent: Feb. 28, 2017

(54) ACCESSING DATA IN A COMPRESSED CONTAINER THROUGH DYNAMIC REDIRECTION

(71) Applicant: Microsoft Corporation, Redmond, WA (US)

(72) Inventors: Richard A. Pletcher, Redmond, WA (US); Malcolm J. Smith, Bellevue, WA (US); Alain F. Gefflaut, Kirkland, WA (US); Alex Bendetov, Redmond, WA (US); Andrey Shedel, Sammamish, WA (US); David J. Linsley, Seattle, WA (US); Aaron M. Farmer, Seattle, WA (US); James Aaron Holmes, Sammamish, WA (US); Troy E. Shaw, Redmond, WA (US); Emily N. Wilson, Seattle, WA (US); Innokentiy Basmov, Redmond, WA (US); Michael J. Grass, Kenmore, WA (US); Alex M. Semenko, Issaquah, WA (US); Scott D. Anderson, Seattle, WA (US); Kinshuman Kinshumann, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 14/099,988

(22) Filed: Dec. 8, 2013

(65) Prior Publication Data
US 2015/0161155 A1    Jun. 11, 2015

(51) Int. Cl.
*G06F 17/30*    (2006.01)
*G06F 3/06*    (2006.01)

(52) U.S. Cl.
CPC ...... *G06F 17/30153* (2013.01); *G06F 3/0643* (2013.01); *G06F 17/30091* (2013.01); *G06F 17/30233* (2013.01)

(58) Field of Classification Search
CPC ................................................ G06F 17/30153
See application file for complete search history.

(56) References Cited

U.S. PATENT DOCUMENTS 5,142,680 A    8/1992 Ottman et al.
5,155,594 A    10/1992 Bernstein et al.
(Continued)

FOREIGN PATENT DOCUMENTS

WO    9742558 A2    11/1997
WO    2009003189 A1    12/2008

OTHER PUBLICATIONS

Favelu, et al., "Image-Retrieval Agent: Integrating Image Content and Text", Oct. 1999, IEEE Intelligent Systems, pp. 36-39.
(Continued)

*Primary Examiner* — Syed Hasan
(74) *Attorney, Agent, or Firm* — John Jardine; Dan Choi; Micky Minhas (57) ABSTRACT

Embodiments of the disclosure provide access to data in a compressed container through dynamic redirection, without storing decompressed data in persistent memory. The compressed container is stored in a first portion of memory. User data and reference files, with redirect pointers, for accessing corresponding files in the compressed container are stored in a second portion of memory. A command to access data is detected by a computing device. The redirect pointer in the reference file associated with the command redirects access to the corresponding compressed version of data stored in the compressed container. The corresponding accessed compressed version of data is decompressed on the fly and provided in response to the command without storing the decompressed data in persistent memory. Some embodiments provide integrity protection to validate the data coming from the compressed container.

20 Claims, 7 Drawing Sheets

(56) References Cited

U.S. PATENT DOCUMENTS

| | | | |
|---|---|---|---|
| 5,267,330 A | 11/1993 | Masuda | |
| 5,307,497 A | 4/1994 | Feigenbaum et al. | |
| 5,467,441 A | 11/1995 | Stone et al. | |
| 5,469,573 A | 11/1995 | McGill et al. | |
| 5,519,869 A | 5/1996 | Payne et al. | |
| 5,555,416 A | 9/1996 | Owens et al. | |
| 5,574,906 A | 11/1996 | Morris | |
| 5,634,052 A | 5/1997 | Morris | |
| 5,694,201 A | 12/1997 | Hayashi et al. | |
| 5,713,024 A | 1/1998 | Halladay | |
| 5,732,265 A | 3/1998 | Dewitt et al. | |
| 5,794,052 A | 8/1998 | Harding | |
| 5,813,008 A | 9/1998 | Benson et al. | |
| 5,813,017 A | 9/1998 | Morris | |
| 5,933,842 A | 8/1999 | Ross | |
| 5,940,871 A | 8/1999 | Goyal et al. | |
| 5,983,239 A | 11/1999 | Cannon | |
| 6,016,400 A | 1/2000 | Day et al. | |
| 6,021,415 A | 2/2000 | Cannon et al. | |
| 6,080,207 A | 6/2000 | Kroening et al. | |
| 6,098,158 A | 8/2000 | Lay et al. | |
| 6,122,734 A | 9/2000 | Jeon | |
| 6,138,179 A | 10/2000 | Chrabaszcz et al. | |
| 6,167,562 A | 12/2000 | Kaneko | |
| 6,188,779 B1 | 2/2001 | Baum | |
| 6,247,128 B1 | 6/2001 | Fisher et al. | |
| 6,259,820 B1* | 7/2001 | Stone | H04N 19/60 375/E7.226 |
| 6,262,726 B1 | 7/2001 | Stedman et al. | |
| 6,279,109 B1 | 8/2001 | Brundridge | |
| 6,282,711 B1 | 8/2001 | Halpern et al. | |
| 6,304,965 B1 | 10/2001 | Rickey | |
| 6,343,265 B1 | 1/2002 | Glebov et al. | |
| 6,357,000 B1 | 3/2002 | Jain | |
| 6,374,353 B1 | 4/2002 | Settsu et al. | |
| 6,377,958 B1 | 4/2002 | Orcutt | |
| 6,385,766 B1 | 5/2002 | Doran, Jr. et al. | |
| 6,405,265 B1* | 6/2002 | Kronenberg | G06F 3/0601 707/999.001 |
| 6,434,695 B1 | 8/2002 | Esfahani et al. | |
| 6,453,363 B1 | 9/2002 | Slivka et al. | |
| 6,453,413 B1 | 9/2002 | Chen et al. | |
| 6,512,526 B1 | 1/2003 | McGlothlin et al. | |
| 6,532,474 B2 | 3/2003 | Iwamoto et al. | |
| 6,598,223 B1 | 7/2003 | Vrhel, Jr. et al. | |
| 6,636,958 B2 | 10/2003 | Abboud et al. | |
| 6,658,563 B1 | 12/2003 | Ice, Jr. et al. | |
| 6,681,323 B1 | 1/2004 | Fontanesi et al. | |
| 6,701,513 B1 | 3/2004 | Bailey | |
| 6,711,624 B1 | 3/2004 | Narurkar et al. | |
| 6,718,548 B1 | 4/2004 | Hsiao | |
| 6,721,002 B1 | 4/2004 | Dotsubo et al. | |
| 6,751,357 B2 | 6/2004 | Boon | |
| 6,763,150 B1 | 7/2004 | MacDonald | |
| 6,763,515 B1 | 7/2004 | Vazquez et al. | |
| 6,782,402 B1 | 8/2004 | Hidaka et al. | |
| 6,868,539 B1 | 3/2005 | Travison et al. | |
| 6,877,154 B2 | 4/2005 | Nagashima et al. | |
| 6,938,211 B1 | 8/2005 | Chang et al. | |
| 6,944,865 B1 | 9/2005 | Zurawski | |
| 6,947,659 B2 | 9/2005 | Nishi et al. | |
| 6,947,954 B2 | 9/2005 | Cohen et al. | |
| 6,976,058 B1 | 12/2005 | Brown et al. | |
| 7,017,144 B2 | 3/2006 | Cohen et al. | |
| 7,120,786 B2 | 10/2006 | Miller et al. | |
| 8,566,286 B1 | 10/2013 | Hawton et al. | |
| 8,732,853 B1* | 5/2014 | Byrne | H04L 63/0838 713/183 |
| 2002/0129233 A1 | 9/2002 | Hillis et al. | |
| 2002/0161932 A1 | 10/2002 | Herger et al. | |
| 2002/0174329 A1 | 11/2002 | Bowler et al. | |
| 2002/0194398 A1 | 12/2002 | Bentley et al. | |
| 2004/0006689 A1* | 1/2004 | Miller | G06F 8/63 713/1 |
| 2004/0034667 A1* | 2/2004 | Sauvage | H04N 1/32144 |
| 2004/0070678 A1 | 4/2004 | Toyama et al. | |
| 2004/0218902 A1 | 11/2004 | Yanagita | |
| 2005/0071668 A1* | 3/2005 | Yoon | G06F 11/28 726/22 |
| 2006/0112313 A1* | 5/2006 | Tripp | G06F 11/1417 714/36 |
| 2008/0177994 A1* | 7/2008 | Mayer | G06F 9/4418 713/2 |
| 2010/0031012 A1* | 2/2010 | Rotondo | G06F 21/575 713/2 |
| 2011/0231629 A1* | 9/2011 | Shiraishi | H03M 7/3086 711/206 |
| 2013/0061228 A1 | 3/2013 | Prasad et al. | |
| 2013/0332917 A1* | 12/2013 | Gaither | G06F 8/67 717/170 |
| 2014/0105271 A1* | 4/2014 | Fallon | H03M 7/30 375/240 |

OTHER PUBLICATIONS

Render, et al., "An Object-Oriented Model of Software Configuration Management", ACM, 1991, pp. 127-139.

Khalidi, et al., "Extensible File Systems in Spring", Proceedings of the Fourteenth ACM Symposium on Operating Systems Principles, 1993, ACM Press, New York, U.S.A., pp. 1-14.

Heidemann, et al., "File-System Development with Stackable Layers", ACM Transactions on Computer Systems (TOCS), Feb. 1994, vol. 12, Issue 1, ACM Press, New York, U.S.A., pp. 58-89.

Rubini, "Kernel Korner: Booting the Kernel", Linux Journal, Jun. 1997, vol. 1997, Issue 38es, Specialized Systems Consultants, Inc., Seattle, WA, U.S.A., 7 pages.

Helander, et al., "MMLite: A Highly Componentized System Architecture", Proceedings of the 8th ACM SIGOPS European Workshop on Support for Composing Distributed Applications, 1998, ACM Press, New York, U.S.A., pp. 96-103.

Solomon, et al., Inside Microsoft Windows 2000 Third Edition, Microsoft Press, 2000, pp. 46-87, 177-206, and 215-236.

Zhang, et al., "A Modeling Perspective of Image-Based Installation", Dell White Paper, Mar. 2002, U.S.A., pp. 1-13.

White Paper, "Microsoft Windows 2000 Server-Remote Operating System Installation", Microsoft Corporation, 1999, U.S.A., pp. i-iv, 1-41.

"Windows Imaging File Format (WIM)", Retrieved at http://technet.microsoft.com/en-us/library/cc749478(d=printer, v=ws.10). aspx, Retrieved Date: Nov. 22, 2013, 2 pages.

VHD (file format), Wikipedia, Retrieved Date: Dec. 4, 2013, 5 pages.

"NTFS", Wikipedia, Retrieved Date: Dec. 4, 2013, 21 pages.

U.S. Appl. No. 10/608,350, Non-Final Office Action mailed Feb. 9, 2006, 11 pages.

U.S. Appl. No. 10/608,350, Notice of Allowance mailed Jun. 2, 2006, 9 pages.

U.S. Appl. No. 10/172,953, Non-Final Office Action mailed Jan. 13, 2005, 9 pages.

U.S. Appl. No. 10/172,953, Notice of Allowance mailed May 3, 2005, 7 pages.

U.S. Appl. No. 10/172,953, Notice of Allowance mailed May 31, 2005, 4 pages.

U.S. Appl. No. 10/173,297, Non-Final Office Action mailed Sep. 30, 2005, 19 pages.

U.S. Appl. No. 10/173,297, Notice of Allowance mailed Nov. 28, 2005, 11 pages.

"International Search Report and Written Opinion Issued in PCT Patent Application No. PCT/US2014/067843", Mailed Date: Mar. 9, 2015, 15 pages.

Bolosky, et al., "Single Instance Storage in Windows(R) 2000", In Proceedings of the 4th conference on USENIX Windows Systems Symposium, vol. 4, Aug. 3, 2000, 13 pages.

"Second Written Opinion Issued in PCT Application No. PCT/US2014/067843", Mailed Date: Nov. 16, 2015, 8 pages.

(56) References Cited

OTHER PUBLICATIONS

"International Preliminary Report on Patentability Issued in PCT Application No. PCT/US2014/067843", Mailed Date: Feb. 11, 2016, 11 Pages.

* cited by examiner

ACCESSING DATA IN A COMPRESSED CONTAINER THROUGH DYNAMIC REDIRECTION

BACKGROUND

Storage space is a critical resource on computing devices such as mobile telephones, tablets, and other small form factor devices. One of the major consumers of storage space on such computing devices is an operating system and pre-installed software that comes bundled with the computing device. Some existing systems reduce storage space consumption on the computing devices by removing functionality from the operating system, or by providing fewer pre-installed applications. However, removing functionality from the operating system can create compatibility problems, and removing pre-installed applications degrades the user experience for a new computing device.

Data compression reduces the storage space requirement for data depending on the particular compression algorithm used and/or the data itself. Some existing systems install the operating system on the computing device from a compressed version of the operating system. In such systems, every file is written to the persistent memory at least twice, sometimes even three times. For example, the compressed operating system is first copied to a target volume, and then decompressed into additional storage. In some cases, to provide recovery from a system crash, a compressed copy of the operating system and user data is also created and stored. As the size of operating systems continues to grow, the storage space consumption with the existing systems continues to increase resulting in higher costs for the computing devices or to a poor user experience.

SUMMARY

Embodiments of the disclosure enable a computing device to access data in a compressed container through dynamic file redirection. The computing device detects an access to a file in a second portion of storage. A corresponding compressed version of the file, stored within the compressed container in a first portion of storage, is accessed via a redirect pointer associated with the file in the second portion of storage. The computing device decompresses the corresponding compressed version of the file and responds to the command with the decompressed data without storing the decompressed file in persistent storage (e.g., as if the file would have been accessed uncompressed).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
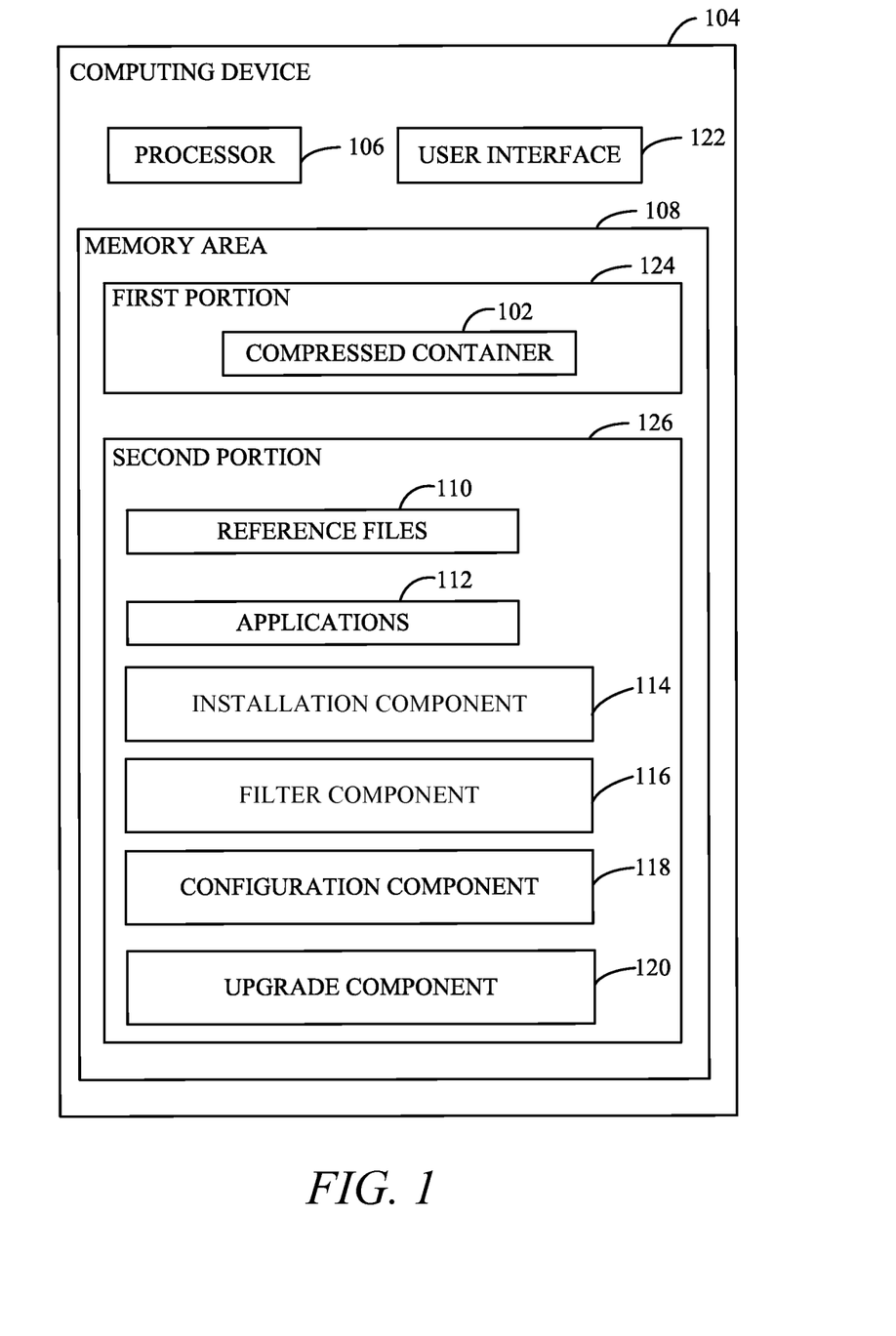
FIG. 1 is an exemplary block diagram illustrating a computing device for accessing data in a compressed container through dynamic file redirection.

Referring to the figures, embodiments of the disclosure enable a computing device 104 to access data in a compressed container 102 (e.g., a compressed image) through dynamic redirection. The compressed container 102 has a plurality of files and is stored in a first portion 124 of a memory area 108. A plurality of reference files 110, corresponding to the plurality of files in the compressed container 102, are created and stored in a second portion 126 of the memory area 108. Each created reference file 110 includes a redirect pointer to the corresponding one of the plurality of files in the compressed container 102. In some embodiments, a request from an application 112 to access data represented by one of the reference files 110 is received. In response to the received request, the corresponding one of the plurality of files in the compressed container 102 is accessed via the redirect pointer in the reference file 110. At least a portion of the accessed corresponding file in the compressed container 102 is decompressed and data provided to the application 112 without storing the decompressed portion in persistent memory. For example, persistent memory represents any memory storing data that is retained after a reboot or power reset.

In some embodiments, every time there is a request from any of the applications 112 to access at least one of the reference files 110, a redirect pointer in the reference file 110 is used to redirect access to the corresponding file from the compressed container 102. The redirect pointer may be an absolute or relative offset value into the compressed container 102. For example, the redirect pointer may point to somewhere within a file instead of the beginning of the file. The corresponding file in the compressed container 102, or a portion of the corresponding file, is decompressed dynamically, on the fly, or otherwise on demand, and provided to the application 112. The redirection of access from the reference file 110 to the corresponding file in the compressed container 102 is done transparently to the user and to components of the computing system other than the operating system (e.g., transparent to upper computing layers).

Aspects of the disclosure enable a significant reduction in the storage space requirement of an operating system storage footprint by using a compressed version of the files. From a user perspective, the computing system provides a user experience comparable to that of a fully installed (e.g., uncompressed) operating system in terms of functionality, performance, and security. However, the user benefits from an enhanced user experience, as more storage space is available for storing user data and/or other applications 112. Additionally, disks with more free space tend to be faster than disks with less free space, further enhancing the user experience. While some existing schemes rely on dividing files into chunks and then compressing the individual chunks, some aspects of the disclosure achieve faster compression by compressing system files only at the file level (e.g., no division into chunks). In some embodiments, a feature rich and secure operating system is provided without using a large amount of storage available to the computing device 104. In scenarios involving multiple compressed containers 102, aspects of the disclosure enable stacking of the compressed containers 102 to compose a full operating system image.

Referring again to FIG. 1, an exemplary block diagram illustrates the computing device 104 for accessing data in the compressed container 102 through dynamic file redirection. The computing device 104 represents any device executing instructions (e.g., as application programs, operating system functionality, or both) to implement the operations and functionality described herein. The computing device 104 may include a mobile computing device or any other portable device. In some embodiments, the mobile computing device includes a mobile telephone, laptop, tablet, computing pad, netbook, gaming device, and/or portable media player. The computing device 104 may also include less portable devices such as desktop personal computers, kiosks, tabletop devices, industrial control devices, wireless charging stations, and electric automobile charging stations. Additionally, the computing device 104 may represent a group of processing units or other computing devices, such as servers in a server farm.

In some embodiments, the computing device 104 has at least one processor 106, the memory area 108, and at least one user interface 122. The processor 106 includes any quantity of processing units, and is programmed to execute computer-executable instructions for implementing aspects of the disclosure. The instructions may be performed by the processor 106 or by multiple processors executing within the computing device 104, or performed by a processor external to the computing device 104. The processor 106 is programmed to execute instructions such as those illustrated in the figures (e.g., FIGS. 2, 3, 4, and 5).

In some embodiments, the processor 106 represents an implementation of analog techniques to perform the operations described herein. For example, the operations may be performed by an analog computing device and/or a digital computing device.

The computing device 104 further has one or more computer readable media such as the memory area 108 or other storage. The memory area 108 includes any quantity of media associated with or accessible by the computing device 104. The memory area 108 may be internal to the computing device 104 (as shown in FIG. 1), external to the computing device 104 (not shown), or both (not shown). In some embodiments, the memory area 108 includes read-only memory and/or memory wired into an analog computing device 104.

The memory area 108 stores, among other data, one or more applications 112. The applications 112, when executed by the processor 106, operate to perform functionality on the computing device 104. Exemplary applications 112 include mail application programs, web browsers, calendar application programs, address book application programs, messaging programs, media applications, location-based services, search programs, and the like. The applications 112 also include operating system components, in some embodiments. The applications 112 may communicate with counterpart applications or services such as web services accessible via a network. For example, the applications 112 may represent downloaded client-side applications that correspond to server-side services executing in a cloud.

The memory area 108 further stores at least one compressed container 102 and reference files 110. Each reference file 110 corresponds to at least one respective file in the compressed container 102 (or other compressed containers 102). In some embodiments, the reference files 110 are referred to as tombstones, placeholders, shadow files, or the like. Each reference file 110 may include metadata about whether the reference file 110 includes a redirect pointer or the reference file 110 includes updated data. If the reference file 110 includes a redirect pointer to the respective file in the compressed container 102, the corresponding file from the compressed container 102 is decompressed when the reference file 110 is requested (e.g., in response to a read or write command). However, if the reference file 110 stores updated data (e.g., an updated version of the corresponding file in the compressed container 102) instead of the redirect pointer, the reference file 110 itself is provided responsive to a request from one of the applications 112 without accessing the compressed container 102. In some embodiments, the reference file 110 may store both a redirect pointer and an updated file (e.g., to enable redlining or other comparison between the original, compressed version of the file and the updated file). Alternatively or in addition, the reference file 110 may store more than one redirect pointer (e.g., if there are multiple versions of the compressed containers 102, such as for backup, recovery, and/or servicing).

Figure 6:
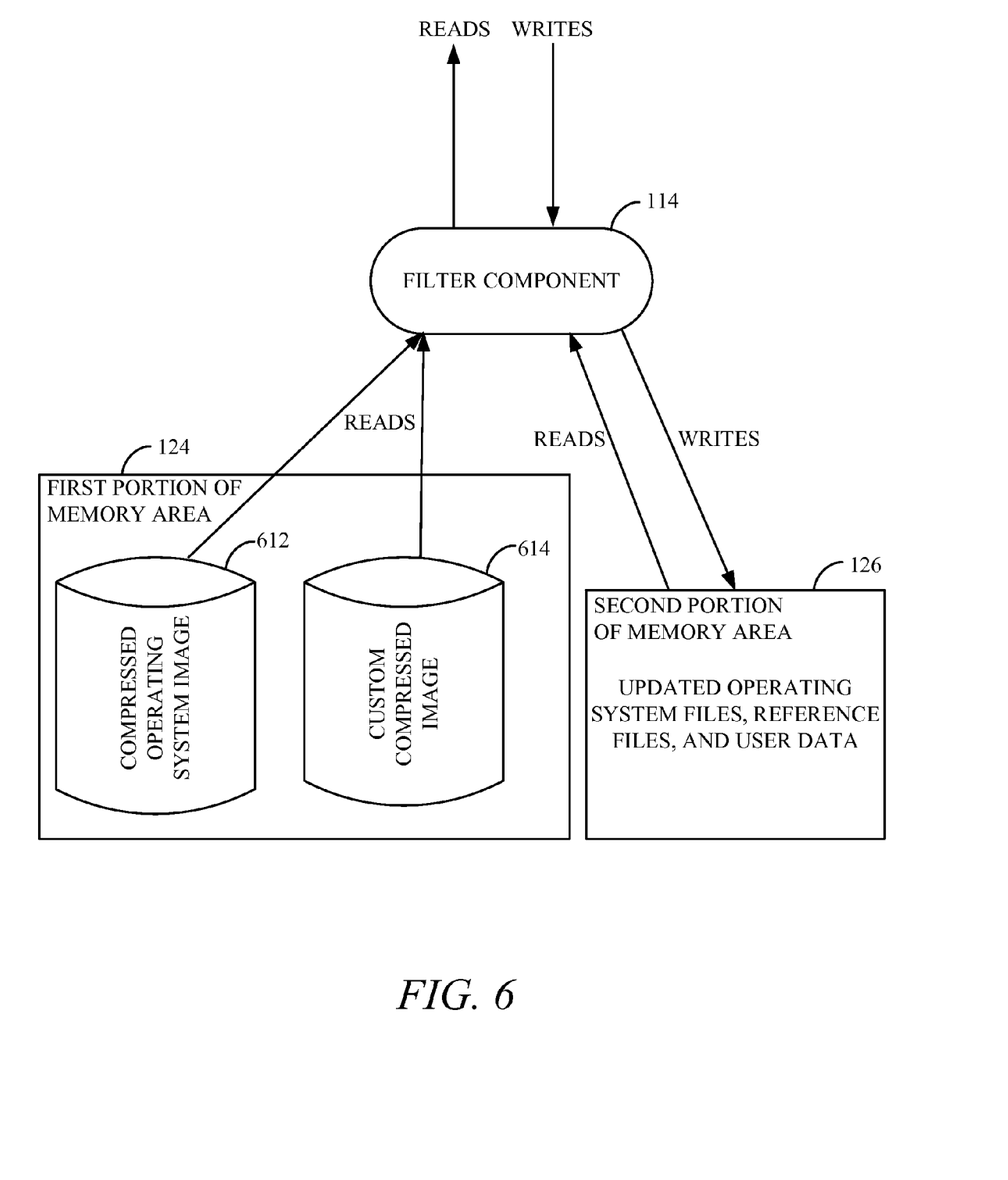
FIG. 6 is an exemplary diagram illustrating operation of a filter component to process a read command or a write command.

The compressed container 102 may include a single compressed container 102 representing an operating system. One or more of the applications 112 (e.g., default applications, or original equipment manufacturer applications) may be included in the compressed container 102. In other embodiments, there are at least two compressed containers 102: a compressed operating system image 612 (e.g., first image) corresponding to the operating system and a custom compressed image 614 (e.g., a second image) corresponding to the default set of applications 112. The multiple compressed containers 102 may be layered, nested, stacked, or otherwise arranged (e.g., in a priority order). For example, an operating system compressed image may remain immutable while another compressed image may be additive or supersede older compressed images (e.g. upgradeable or upgraded compressed containers 102). The other compressed containers 102 may exemplarily comprise third party applications or system specific drivers, and may be added to the computing device 104 by the user.

The memory area 108 further stores one or more computer-executable components. Exemplary components include an installation component 114, a filter component 116, a configuration component 118, and an upgrade component 120. The installation component 114, when executed, causes the processor 106 to access the compressed container 102 having a plurality of files. The compressed container 102 is stored in the first portion 124 of memory. The installation component 114 creates a plurality of reference files 110 corresponding to the plurality of files in the compressed container 102 and stores the created reference files 110 in the second portion 126 of memory. Each of the created reference files 110 is populated with a redirect pointer to the corresponding one of the plurality of files in the compressed container 102.

In some embodiments, the installation component 114 (e.g., of the computing device 104, or another computing device) copies the compressed container 102 to a target volume associated with the computing device 104, and optionally modifies the compressed container 102 during the installation. There may be plurality of the compressed containers 102 that are copied by the installation component 114. For example, a first compressed image may correspond to an executing operating system and a second compressed image may correspond to customized applications and/or drivers.

The filter component 116, when executed, causes the processor 106 to receive a request from at least one of the applications 112 to access at least one of the plurality of reference files 110. In response to the received request, the corresponding one (or more) of the plurality of reference files 110 in the compressed container 102 is accessed via the redirect pointer. The filter component 116 decompresses the accessed corresponding one of the plurality of files in the compressed container 102. The decompression of only the accessed corresponding one (or more) of the plurality of files in the compressed container 102 is performed dynamically to provide fast and transparent access to the files in the compressed container 102. The decompressed file is provided to the requesting application 112 without storing the decompressed file in persistent memory, thereby preserving storage space on the computing device 104.

The filter component 116 executes in a context of an executing operating system. The filter component 116 may be embodied in software, firmware, and/or hardware.

The configuration component 118, when executed, causes the processor 106 to access a configuration file that maintains a list of compressed containers 102. The configuration file may additionally include metadata for identifying the compressed container 102 to be accessed for each reference file 110. The filter component 116 uses the accessed configuration file to identify the compressed container 102 for accessing the corresponding one of the plurality of files in the identified compressed container 102 via the redirect pointer in the reference file 110.

The upgrade component 120 when executed causes the processor 106 to replace the redirect pointer in the reference file 110 with the updated data. Subsequently, whenever a request from at least one of the applications 112 for updated data is received, the reference file 110 (with the updated data) is provided to the application 112 without accessing the compressed container 102.

If a file on the compressed container 102 is to be deleted, the upgrade component 120 removes the reference file 110 and thus the corresponding file in the compressed container 102 becomes inaccessible. In some embodiments, the file in the compressed container 102 is also removed. In other embodiments, the file in the compressed container 102 remains in the compressed container 102.

The upgrade component 120 may also be used to upgrade the compressed container 102. For example, a new compressed container 102 may be copied to the computing device 104 without removing the earlier compressed container 102. After the new compressed container 102 is validated, verified, or otherwise confirmed to work properly, the new compressed container 102 is used as the new de-facto compressed container 102 and the earlier compressed container 102 is either removed or rendered inaccessible (e.g., by reformatting or otherwise modifying each of the reference files 110 to point to the new compressed container 102).

Figure 2:
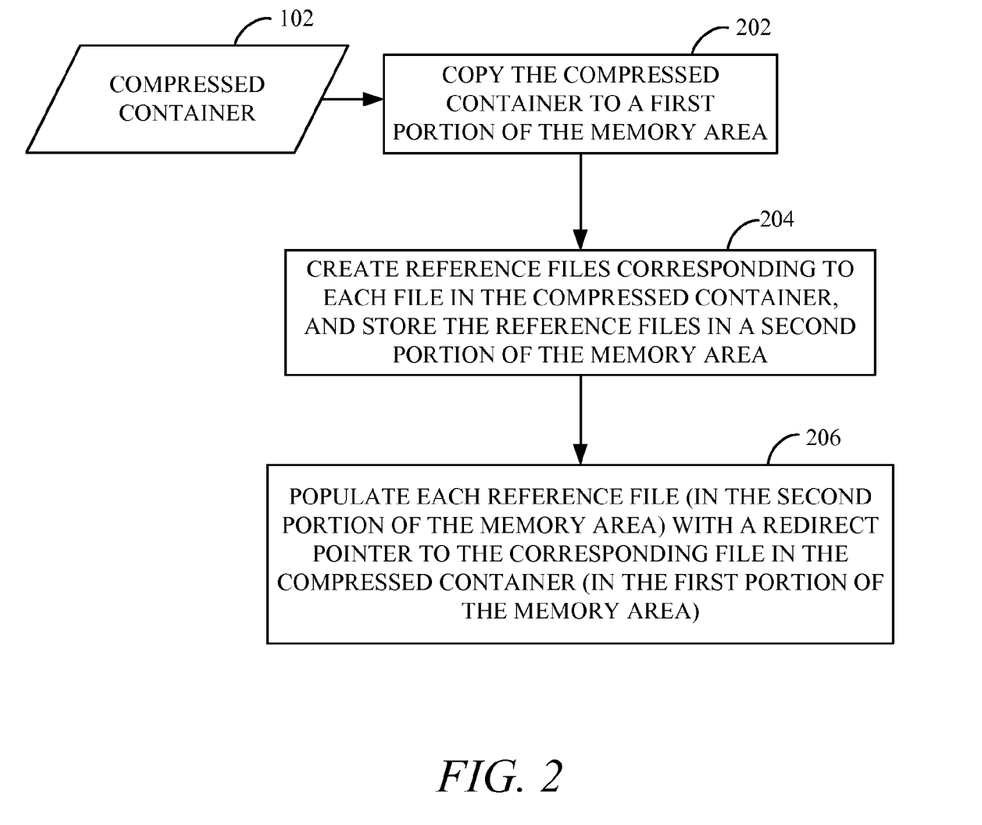
FIG. 2 is an exemplary flow chart illustrating operation of a computing device to install a compressed container and create reference files populated with redirection pointers.

Referring next to FIG. 2, an exemplary flow chart illustrates operation of the computing device 104 to install the compressed container 102 and create the reference files 110 populated with redirection pointers. The compressed container 102 is provided (e.g., via a distribution media, or as a download from a web service or other content source). At 202, the compressed container 102 is copied in the first portion 124 of the memory area 108. Alternatively or in addition, the compressed container 102 may remain on the installation media At 204, the reference files 110 corresponding to each file in the compressed container 102 are created and stored in the second portion 126 of the memory area 108. In some embodiments, the second portion 126 represents a user volume, or a partition on a volume. At 206, each reference file 110 in the second portion 126 of the memory area 108 is populated with a redirect pointer providing a link to the corresponding file in the compressed container 102.

Figure 3:
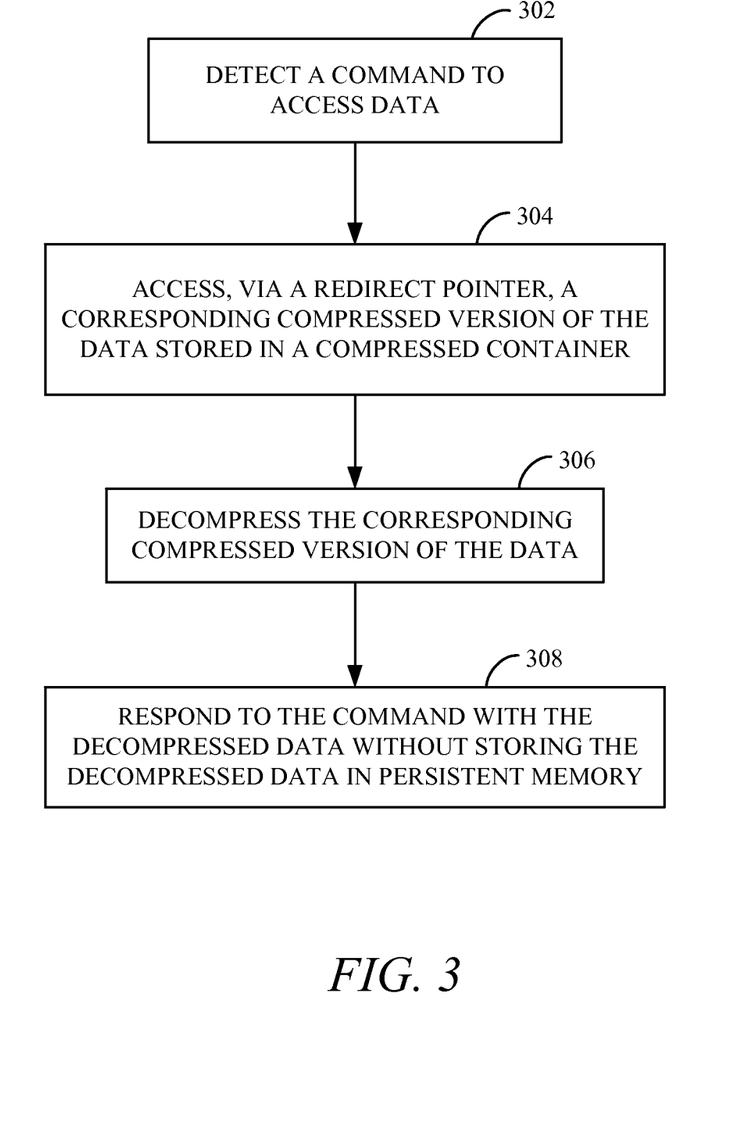
FIG. 3 is an exemplary flow chart illustrating operation of a computing device to access data from a compressed container.

Referring next to FIG. 3, an exemplary flow chart illustrates operation of the computing device 104 to access data from the compressed container 102. At 302, a command to access data in the first portion 124 of memory is detected by the computing device 104. The command is to access a file in the second portion 126 of memory. The command may be generated, for example, when the user of the computing device 104 launches a new application 112, accesses functionality of the already executing application 112, and/or attempts to read or write a file. At 304, a corresponding compressed version of the data is accessed via the redirect pointer associated with the file in the second portion 126 of memory. The corresponding compressed version of the data is stored in the first portion 124 of memory. At 306, the computing device 104 decompresses the corresponding accessed compressed version of the data from the first portion 124. At 308, the computing device 104 responds to the command with the decompressed data without storing the decompressed data in persistent memory.

Figure 4:
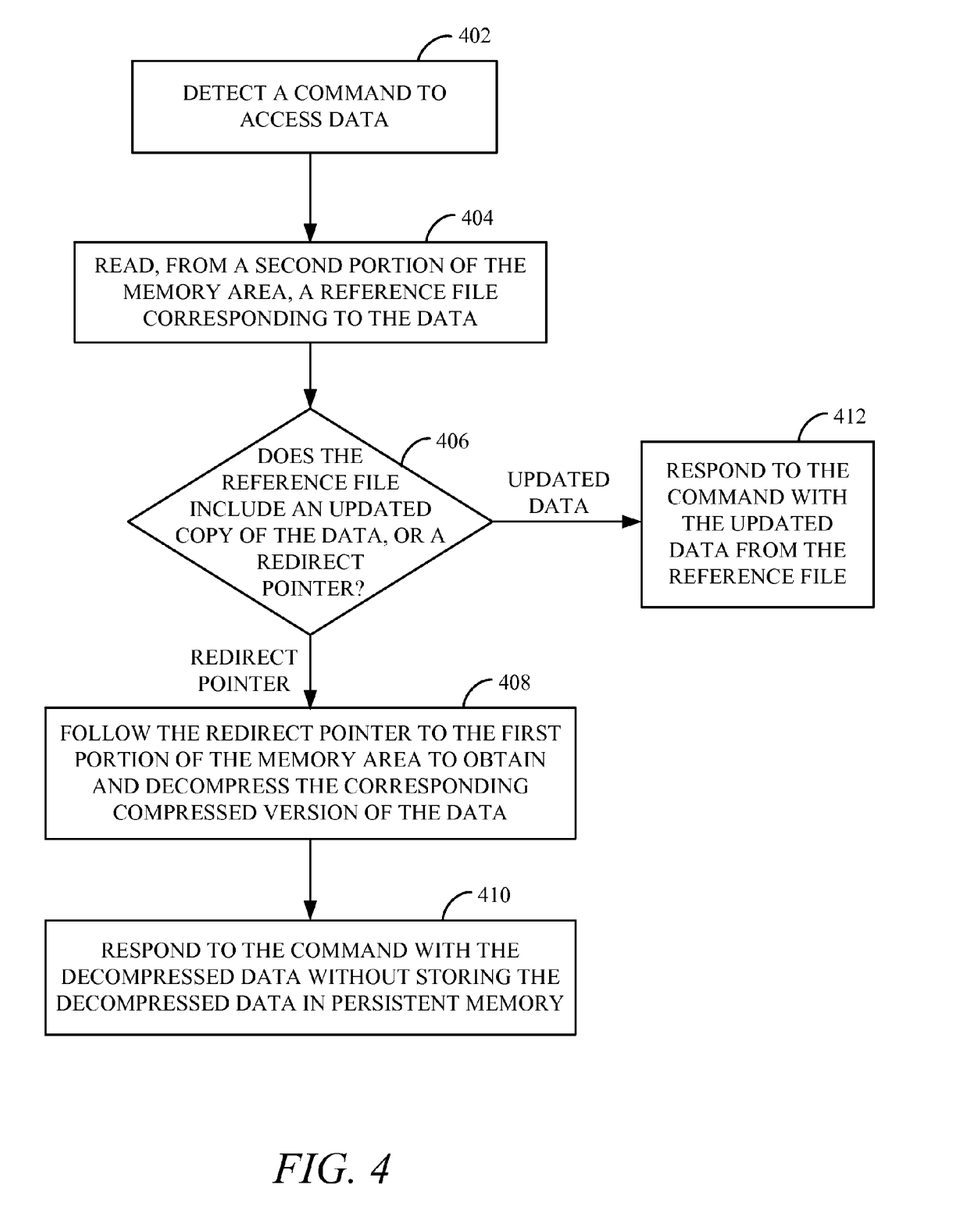
FIG. 4 is an exemplary flow chart illustrating operation of a computing device to access data from a compressed container or updated data in a reference file.

Referring next to FIG. 4, an exemplary flow chart illustrates operation of the computing device 104 to access data from the compressed container 102 or updated data in the reference file 110. At 402, a command to access data is detected. The command is directed by a user, application 112, and/or service to data (e.g., one of the reference files 110) stored in the second portion 126 of the memory area 108. At 404, the reference file 110 corresponding to the command is read from the second portion 126 of the memory area 108. At 406, the computing device 104 determines whether the reference file 110 includes updated data or a redirect pointer. If the outcome of determination at 406 is that the reference file 110 includes a redirect pointer, the corresponding compressed version of the data (stored in the first portion 124 of the memory area 108) is decompressed at 408. In response to the detected command at 402, the decompressed data is provided to a requesting application 112 at 410 without storing the decompressed data in persistent memory. However, if the outcome of determination at 406 is that the reference file 110 includes updated data, the command detected at 402 is provided with the updated data in the reference file 110 without accessing the compressed container 102 at 412, in some embodiments. In another embodiment, the command detected at 402 is provided with the updated data from an alternate compressed container 102 at 412.

Figure 5:
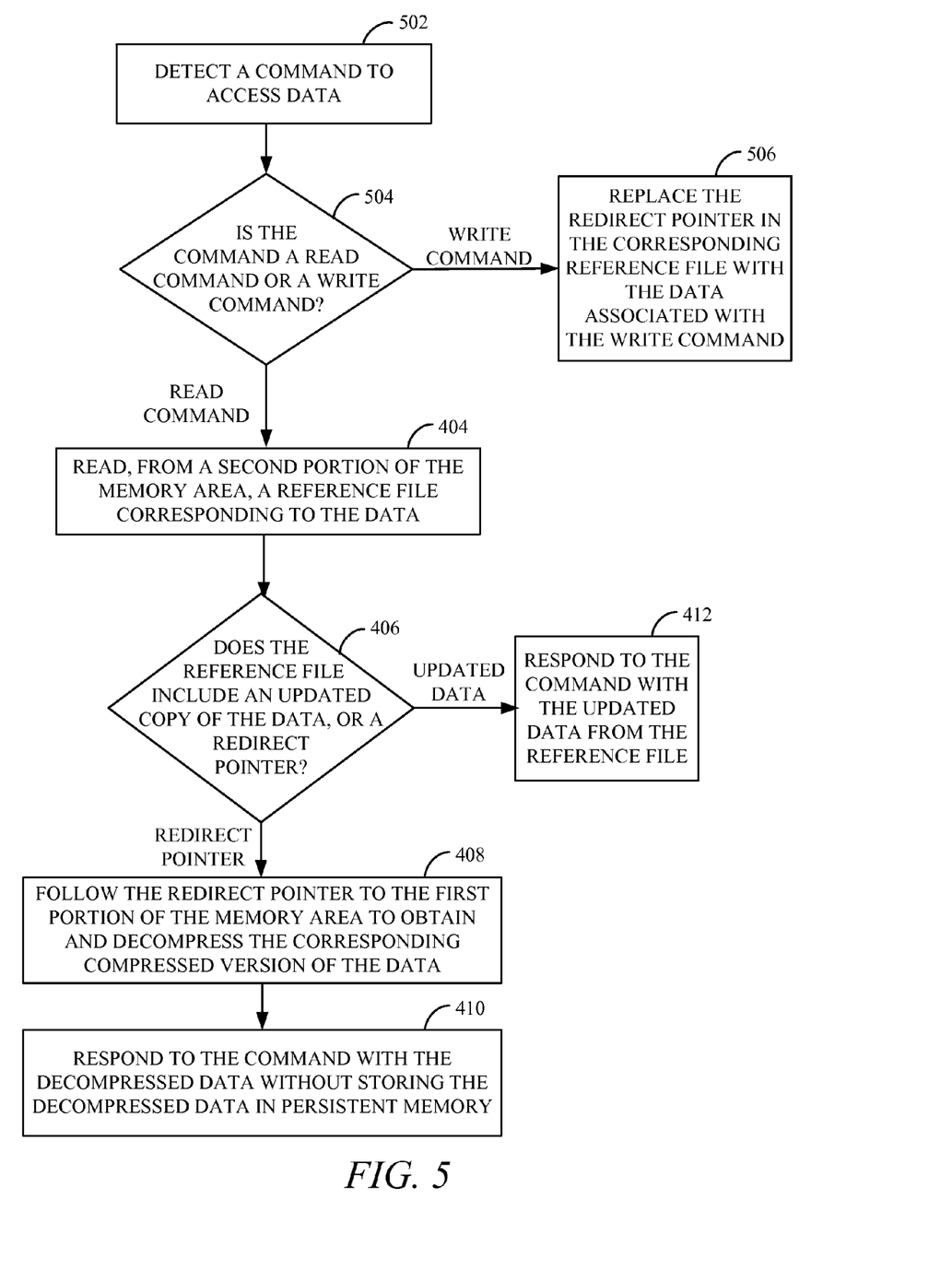
FIG. 5 is an exemplary flow chart illustrating operation of a computing device to process a read command or a write command using data redirection.

Referring next to FIG. 5, an exemplary flow chart illustrates operation of the computing device 104 to process a read command or a write command for data in a memory area portion. At 502, a command for data is detected, intercepted, or otherwise received by the computing device 104. The command is issued by a user, application 112, and/or service to data (e.g., one of the reference files 110) stored in the second portion 126 of the memory area 108. At 504, the computing device 104 determines whether the detected command at 502 corresponds to a read command or a write command. If the outcome of the determination at 504 is that the detected command corresponds to a read command, the control passes to 404 and execution proceeds as described above with respect to FIG. 4. However, if the outcome of the determination at 504 is that the detected command corresponds to a write command, at 506, the redirect pointer in the corresponding reference file 110 is replaced with the data associated with the write command (e.g., remove the redirect pointer from the reference file 110, and mark the reference file 110 as no longer sparse). In some embodiments, subsequent read/write commands directed to reference files 110 without redirect pointers are no longer intercepted by the computing device 104 for processing (e.g., the operations in FIG. 5 are not performed). In some products, the redirect pointers are incorporated into, otherwise implemented with, reparse points.

In some embodiments, the computing device 104 may include a communications interface component (not shown) that includes a network interface card and/or computer-executable instructions (e.g., a driver) for operating the network interface card. Communication between the computing device 104 and other devices may occur using any protocol or mechanism over any wired or wireless connection. In some embodiments, the communications interface is operable with short-range communication technologies such as by using near-field communication (NFC) tags.

In some embodiments, the computing device 104 may include a user interface component (not shown) that includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device 104 in a particular way. These commands to the reference files 110 may be dynamically redirected to the corresponding compressed container 102 via the redirect pointers in the reference files 110.

For example, the computing device 104 detects a command to access data in the first portion 124 of memory. The first portion 124 of memory in this example includes reference files 110 that are accessible to the detected command. In response to the command, a corresponding compressed version of data stored within the compressed container 102 in the second portion 126 of memory is accessed via a redirect pointer associated with the data (e.g., the reference file 110) in the first portion 124 of memory. Each of the reference files 110 in the first portion 124 of memory store at least one of the redirect pointers to access the corresponding compressed version of the data stored in the second portion 126 of memory. The computing device 104 decompresses the corresponding accessed compressed version of data and responds to the command with the decompressed data without storing the decompressed data in persistent memory.

Aspects of the disclosure are operable with any decompression algorithm for obtaining files from the compressed container 102. The decompression algorithm may be selected from a plurality of decompression algorithms to decompress the corresponding compressed version of data. The selection may be based on a frequency of access of the corresponding compressed version of the data. For example, while a faster decompression algorithm (e.g., less time to decompress data) may be selected for decompressing frequently accessed data, a slower but more space efficient (e.g., resulting in less storage usage) decompression algorithm may be selected for decompressing less frequently accessed (e.g., rarely accessed) data. To determine whether data is frequently or less frequently accessed, the computing device 104 may compare the frequency of access for a file to a predefined threshold value (e.g., more than five times per day). In some embodiments, decompressing data may be performed by a plurality of processing cores in the computing device 104. This parallelizes the decompression from the compressed versions of data in the compressed container 102.

In some embodiments, a validation of the data will be performed to validate the integrity of the data coming from the compressed container 102. The validation of the compressed container 102 can be done at different levels, such as the whole compressed container 102, on a file basis, and/or on a block level (e.g., where a block is a sub-part of a file). The validation is done only once per boot session (e.g., at boot up of the computing device 104), in some embodiments, and tracked via an in-memory bitmap that enables validation that has been already performed to be bypassed. Aspects of the disclosure are operable with any validation operations, such as hashing. For example, the hash is matched with a root hash securely stored in a separate partition.

An exemplary command to access data in the first portion 124 of memory may be associated with a boot operation of the computing device 104. In such an example, the computing device 104 boots using the compressed version of the data. Further, while the first portion 124 of the memory area 108 and the second portion 126 of the memory area 108 may reside in a same disk partition, the first portion 124 and the second portion 126 may alternatively reside in different disk partitions. To enhance security, the reference files 110 and the user data stored in a separate partition may be encrypted using techniques known in the art. Encryption of a user volume or other user partition does not affect access (e.g., performance) of the compressed container 102 if stored in an unencrypted partition, in such an example. In some embodiments, the compressed container 102 may also be encrypted.

Encryption of the compressed container 102 makes it nearly impossible to tamper with the operating system files offline. However, in embodiments in which the compressed container 102 is not encrypted, to provide a security model against offline attacks, hashes may be generated for the compressed container 102 (e.g., on a 4K granularity). The generated hashes are stored in a protected location (e.g., in an encrypted portion of memory area 108 or a Trusted Platform Module which may be made a part of other metadata) so that the hashes cannot be tampered with offline. The validation is done only once per boot session (e.g., per 4K compressed container 102 section) in some embodiments, and tracked via an in-memory bitmap. For example, when a compressed container 102 section is read, its hash is generated and compared with the stored hash. If the hash does not match, it indicates that the compressed container 102 section might have been tampered with. The in-memory bitmap for a compressed container 102 section is used for performance optimization so that in each boot a given compressed container 102 section is only validated once.

Validation is normally turned off when encryption is turned off. Thus, aspects of the disclosure provide a tamper detection model where trust is established in a volume that is not encrypted by keeping validation data in an encrypted volume and by doing run time tamper detection of the unencrypted volume. In some embodiments, a hash tree, multiple levels deep, may be created and the root of the hash tree may be signed with a key to protect its integrity. As an alternative to signing, the root hash may be stored in a protected location and the hash tree may be stored unprotected.

In another embodiment, when encryption is turned off (e.g., hashing protection is also off), offline tampering of files (e.g., compressed container 102 sections) is detected with extended attributes on the reference files 110. To determine tampering of the compressed container 102, the file system journal identifier of the volume where the compressed container 102 resides and the file system's Update Sequence Number identifier (USN ID) of the compressed container 102 is also kept in the extended attribute. Because there may be more than one compressed container 102, the appropriate compressed container 102 is determined both at the time when the extended attribute is set and when the extended attribute is read. The USN ID and the file system journal identifier for the compressed container 102 are compared with the values stored in the extended attribute, and the extended attribute is only trusted if the values match. If the values do not match, the extended attribute is discarded, the file within the compressed container 102 is fully verified, and if validation succeeds a new extended attribute is set.

In some embodiments, offline tampering of the compressed container 102 is detected using trusted platform module (TPM) boot counters instead of USN IDs and journal identifiers. The TPM boot counters are automatically incremented when the computing device 104 boots. The last known TPM boot counter may be kept in a secure location outside the operating system such as in a Unified Extensible Firmware Interface (UEFI) boot variable. If the current TPM boot counter is not strictly incremental compared to the last known value, it can be determined that the computing device 104 may have booted in an alternate unknown operating system. For a valid boot, the UEFI variable is updated with the current TPM boot counter by the trusted operating system.

For optimizing performance aspects, alternatively or in addition to setting the validation of in-memory bitmap when a 4K section of the compressed container 102 is loaded for use, a background task may proactively attempt to perform a best effort validation of the compressed container 102 and populate the bitmap such that most sections of compressed container 102 are already validated before they are actually required. However, if a particular section has not yet been validated by the time that section is accessed, that section will be validated in-line with the access operation.

Prevention of online tampering of the compressed container 102 is implemented, in some embodiments, by making the compressed container 102 inaccessible to use applications (e.g., for writing). Thus, once the computing device 104 boots from the compressed container 102, the files in the compressed container 102 are available only for read.

The compressed container 102, in some embodiments, includes error correction code for performing error correction while accessing the corresponding compressed version of the data in the compressed container 102. For example, the error correction code may span chunks of data (e.g., 4 MB chunks) in the compressed container 102 and allows for re-construction of one page (e.g., 4 KB) of data. The error correction code may be combined with hashing, such that a mismatch in a hash indicates that either the compressed data has changed or the compressed data is corrupt. If so, the error correction code may be used to repair a page that may have been altered or corrupted. In some embodiments, the error correction mechanism is integrated with the filter component 116 to dynamically perform validation and data reconstruction on the fly.

Referring next to FIG. 6, read and/or write requests are intercepted by the filter component 116. The filter component 116 determines if the command is a read command and reads the reference file 110 from the second portion 126 of memory. If the reference file 110 includes a redirect pointer, the corresponding file from the compressed operating system image 612 (or the custom compressed image 614) is accessed and provided to the requesting application 112. If the reference file 110 does not include a redirect pointer and instead stores an updated version of the data associated with the reference file 110, this updated data is provided to the requesting application 112. Further, if the filter component 116 determines that the command is a write command, the redirect pointer in the reference file 110 is replaced with the updated data (e.g., provided with the write command). In this manner, the filter component 116 implements a copy-on-write strategy for updating data.

While the embodiments in FIG. 6 disclose the first portion 124 of memory and the second portion 126 of memory, a person skilled in the art will appreciate that the embodiments of the present disclosure are operable with additional or fewer portions of memory. For example, the custom compressed image 614 may be stored in a separate portion of memory. The different portions of memory may be on a single disk partition, or on different disk partitions. Further, the first portion 124 of memory may alternatively store user data, updated operating system files, and reference files 110, and the second portion 126 of memory may store the compressed containers 102 alone or at least compressed images 612 and 614.

Embodiments of the present disclosure describe a system for accessing data within the compressed container 102. In some embodiments, there may be more than one compressed container 102. The memory area 108 associated with the system stores a plurality of reference files 110 and the compressed container 102 of a plurality of files. The compressed container 102 includes a boot environment. Each of the reference files 110 has a redirect pointer to a corresponding one of the plurality of files in the compressed container 102. The processor 106 associated with the system is programmed to receive a request from at least one of the applications 112 to access one of the plurality of the reference files 110. The request is received by intercepting the access to a file system (e.g., New Technology File System, Network File System, etc.). In response to the received request, the corresponding one of the plurality of files in the compressed container 102 is accessed via the redirect pointer. The accessed corresponding one of the plurality of files is decompressed and the decompressed data is provided to the application 112 without storing the decompressed data in persistent memory.

The processor 106 may be further programmed to receive another request (e.g., a second request) from the application 112 to write data to one of the plurality of the reference files 110. In response to the received second request, the redirect pointer in the one of the plurality of the reference files 110 is replaced with the data, which is requested to be written (e.g., identified in the second request) to the reference file 110. The next time a request is received from the application 112 for this reference file 110 (now storing an updated version of the corresponding one of the plurality of compressed filed in the compressed container 102), the reference file 110 itself (or the data within) is provided to the application 112 without accessing the compressed container 102, as the redirect pointer in the reference file 110 is no longer followed (or has been removed). In some embodiments, the reference file 110 is updated to refer to a new compressed container 102, and the next time a request is received from the application 112 the data provided to the application is accessed from this new compressed container. In some embodiments, an update of the compressed container 102 later may repopulate the over-written reference files 110 with new redirect pointers.

A decision to upgrade the compressed container 102 may be taken by a user of the computing device 104. Alternatively, the decision may be based on one or more of the following: disk usage of the second portion 126 reaching a predefined threshold limit, after a predefined time period, and/or a predefined number of write commands. Upgrading the compressed container 102 may remove data redundancy (e.g., when enough of the reference files 110 have been overwritten with updated data).

In some embodiments, the processor 106 is programmed to allow coexistence of the redirect pointers and extended attributes, on the reference files 110, corresponding to a same one of the plurality of files in the compressed container 102. The coexistence allows code integrity checks to occur and reduces compatibility risks. Code integrity extended attributes (CIEAs) on reference files 110 with redirect pointers further allow for a performance optimization by the presence of a CIEA bit for each compressed executable file. For example, validation of the compressed container 102 may be skipped if the CIEA bit has been set. In this way, the validation of the compressed container 102 is further optimized. The redirect pointers represent metadata such as identifier tags that identify a file in the compressed container 102 from which the data should come from. In one embodiment, the redirect pointer may be implemented as a reparse point (e.g., in NTFS).

In some embodiments, the reparse points in the reference files 110 that enable data redirection from the reference files 110 to the corresponding objects (e.g., files) in the compressed container 102. For example, the reparse point for one of the reference files 110 contains the redirect pointer, as well as a file size, attributes, timestamps, security, and the like. The reference files 110 are sparse, contain no allocation, and have a valid data length advanced to the actual file size. Rather than providing zeroes for the unallocated range in response to a read command, however, the computing device intercepts the read access (e.g., command) and provides the data from the compressed container 102. An exemplary reparse point format includes a generic version (e.g., 4 bytes) and a provider identifier (e.g., 4 bytes), which is followed by provider-specific data. Exemplary provider-specific data include a version (e.g., 4 bytes), identifier of the compressed container 102 containing the corresponding data or object (e.g., 8 bytes), and a hash of the object in the compressed image (e.g., a SHA1 hash of 20 bytes).

To intercept the read/write commands, the computing device 104 performs a file system handshake that includes adding information to the command that instructs the file system to open the reparse point and provide confirmation upon success. The computing device 104 is then able to query, on the same handle that has been opened, the reparse information (e.g., the redirect pointer). After the file system confirms that an object from the compressed container 102 was opened, the computing device 104 queries reparse information and records, via an in-memory context structure, that this requested object is stored in the compressed container 102. The computing device 104 consults a list of the compressed containers 102 to find the matching compressed container 102, then looks up the hash of the file within the compressed container 102. Aspects of the disclosure contemplate multiple hashes, each corresponding to a different section of the compressed container 102. If the object is not found within the compressed container 102, the command is returned with an error. If the object is found, the in-memory structure records information about this object for use in subsequent operations (e.g., reads).

Figure 7:
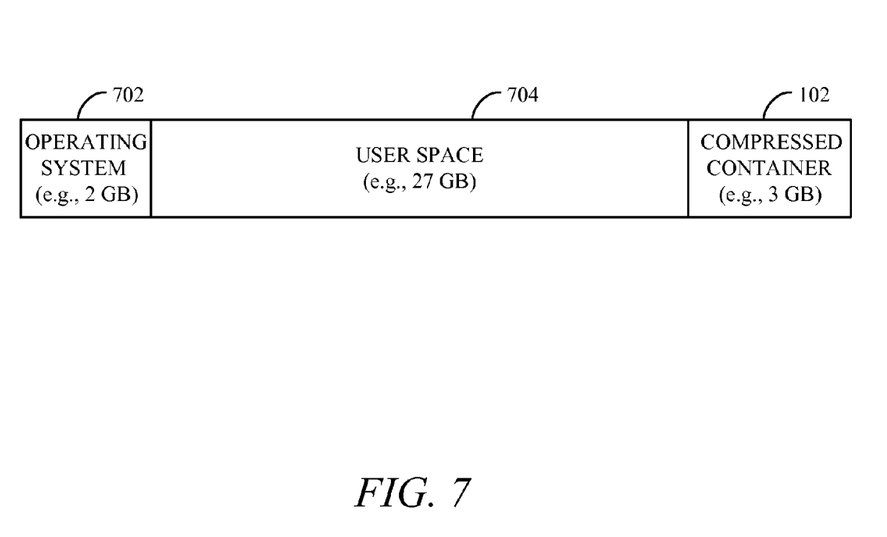
FIG. 7 is an exemplary diagram illustrating an exemplary use of storage space in a computing device as described in the aspects of the disclosure.

Referring next to FIG. 7, an exemplary diagram illustrates an exemplary use of storage space in the computing device 104 in accordance with aspects of the disclosure. For example, if there is an exemplary 32 GB storage space on the computing device 104, the compressed container 102 consumes an exemplary 3 GB of storage space (shown as the compressed container 102). The reference files 110 and the updated data files consume an exemplary 2 GB of storage space (shown as operating system space 702). In contrast, without implementing aspects of the disclosure, the decompressed version of operating system would likely consume around 6 GB of space, or triple the operating system space 702. The rest of the 27 GB is available to the user as user space 704. Thus, implementing aspects of the disclosure frees approximately 4 GB more of user space on the computing device 104 in this example, thereby enhancing the user experience and satisfaction.

Reducing storage space, such as the approximate 4 GB in the above example, creates a big impact on the computing devices 104 with storage space constraints (e.g., 16 GB, 32 GB, or 64 GB), such as in most current mobile computing devices. While particular storage spaces and savings have been described in the above example, the quantities are merely exemplary, and storage space savings may vary based on the image to be compressed and/or the type(s) of compression algorithm used.

Additional Examples

In some embodiments, computer-executable components stored in the memory area 108 include the installation component 114, the upgrade component 120, and the filter component 116. The installation component 114, when executed, causes the processor 106 to store the compressed operating system image 612 and a plurality of the reference files 110 in the first portion 124 and the second portion 126 of the memory area 108 respectively. Each of the reference files 110 has a redirect pointer to a corresponding one of the plurality of files in the compressed operating system image 612. The upgrade component 120, when executed, causes the processor 106 to store updated versions (e.g., compressed and/or uncompressed) of one or more files in the compressed operating system image 612 in the second portion 126 of the memory area 108. The filter component 116, when executed, causes the processor 106 to intercept a request from at least one of the applications 112 to access one of the plurality of reference files 110 in the compressed operating system image 612 stored in the first portion 124 of the memory area 108. The filter component 116 further determines whether the requested file in the compressed operating system image 612 stored in the first portion 124 of the memory area 108 has an updated version stored in the second portion 126 of the memory area 108. Based on the determination, the filter component 116 provides the requested file, from the compressed operating system image 612 stored in the first portion 124 of the memory area 108 or from the updated version stored in the second portion 126 of the memory area 108, to the requesting application 112.

For example, the requested file from the second portion 126 of the memory area 108 is provided to the application 112 when it is determined that the second portion 126 of the memory area 108 stores the updated file (e.g., reference file 110 with updated data and without the redirect pointer). Otherwise, the requested file from the compressed operating system image 612 from the first portion 124 of the memory area 108 is provided to the application 112.

In some embodiments, aspects of the disclosure provide a system comprising the first portion 124 of the memory area 108 storing the compressed operating system image 612, the second portion 126 of the memory area 108 storing a plurality of the reference files 110, and updated versions of one or more files in the compressed operating system image 612. Each of the reference files 110 has a redirect pointer to a corresponding one of the plurality of files in the compressed operating system image 612. The processor 106 is programmed to intercept, using a file system filter, a request from at least one of the applications 112 to access one of the plurality of the reference files 110. The processor 106 is further programmed to determine, using the file system filter, whether the accessed one of the plurality of the reference files 110 includes the redirect pointer. Based on the determination that the accessed one of the plurality of the reference files 110 includes the redirect pointer, the processor 106 is further programmed to provide the requested file, to the application 112, from the compressed operating system image 612 stored in the first portion 124 of the memory area 108 by decompressing the requested file. Otherwise, based on the determination that the accessed one of the plurality of the reference files 110 includes updated data, the processor 106 is further programmed to provide, to the application 112, the updated version stored in the second portion 126 of the memory area 108.

Aspects of the disclosure enable use of multiple compression algorithms within a single compressed container 102. A frequency of access for each of a plurality of files is determined before compressing the plurality of files into a single compressed container 102. The frequency of access may be based on crowd-sourced data access by a plurality of other users (e.g., with a similar profile). Alternatively or in addition, the same policy set may be implemented for employees across an organization (e.g., the policy set may be further differentiated by role, designation, and or division). Other ways of determining the frequency of access are within scope of the present disclosure.

For example, a first set of the plurality of files, with a frequency of access lesser than a predefined threshold, are compressed with a first compression algorithm. A second set of the plurality of files, with the frequency of access more than a predefined threshold, are compressed with a second compression algorithm. In this example, the first compression algorithm is more space efficient (e.g., greater compression) than the second compression algorithm, and the second compression algorithm is faster than the first compression algorithm. In this manner, a file that is accessed more often is compressed with a faster compression algorithm while a file that is accessed rarely is compressed with a more efficient compression algorithm. Files in the compressed container 102 are thus compressed with multiple compression algorithms resulting in a better user experience.

In some embodiments, the functionalities of the filter component 116 are implemented in a virtual file system layer, in the operating system's kernel, and/or in a file system filter. The memory area 108 stores a plurality of the reference files 110, a first compressed container 102 including all operating system files, and one or more other compressed containers 102 including third party applications. Each of the reference files 110 includes a redirect pointer to a corresponding one of the plurality of files in the first compressed container 102 or the one or more other compressed containers 102. The processor 106 is programmed to intercept, using a file system filter, a request from at least one of the applications 112 to access one of the plurality of the reference files 110 having the redirect pointer to the corresponding one of the plurality of files in the first compressed container 102 or the one or more other compressed containers 102. The processor 106 is further programmed to determine, using the file system filter, whether the requested file corresponds to the first compressed container 102 or the one or more other compressed containers 102. Based on the determination, the requested file is provided to the application 112 from the first compressed container 102 or the one or more other compressed containers 102. In some embodiments, the first compressed container 102 having the operating system image may be immutable, while the one or more other compressed containers 102 are upgradable. All the compressed containers 102 in this example may be stacked in a priority order.

Exemplary compressed images (e.g., compressed container 102, compressed operating system image 612, and/or custom compressed images 614, etc.) may be implemented using any compressed container format that supports individually compressed files. Exemplary container formats or compression schemes operable with the disclosure include, but are not limited to, ZIP files, cabinet (CAB) files, archive (TAR) files, WINDOWS brand Imaging Format (WIM) images, Lempel-Ziv-Markov chain (LZMA) algorithms, LZX (e.g., with a 32 KB chunk size), Xpress (e.g., with a 4 KB chunk size), disk image formats, and/or the like.

In some embodiments, the computing device 104 boots from a virtual hard disk. In such embodiments, the compressed container 102 is copied in the virtual hard disk and the boot sequence proceeds from the virtual hard disk.

In an exemplary embodiment, the first portion 124 may store multiple compressed containers 102 corresponding to a plurality of operating systems (e.g., there may be multiple compressed operating system images 612). In such embodiments, the computing device 104 may boot from any of the plurality of compressed operating system images 612 (e.g., based on user selection or using a preferred compressed operating system image 612). The custom compressed image 614 (e.g., there may be more than one custom compressed image 614) in such embodiments may be common for one or more of the operating systems. This results in additional storage space saving on the computing device 104 along with better manageability and upgradability.

At least a portion of the functionality of the various elements in FIGS. 2-5 may be performed by other elements in the figures, or an entity (e.g., processor, web service, server, application program, computing device, etc.) not shown in the figures.

In some embodiments, the operations illustrated in FIGS. 2-5 may be implemented as software instructions encoded on a computer storage medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from the users. In some embodiments, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device (e.g., computing device 104) when configured to execute the instructions described herein.

The embodiments illustrated and described herein as well as embodiments not specifically described herein but within the scope of aspects of the invention constitute exemplary means for accessing data in the compressed container 102 through dynamic redirection. For example, one or more of the embodiments contemplate means for receiving a request from the application 112 to access one of the plurality of the reference files 110; means for accessing, in response to the received request, the corresponding one of the plurality of files in the compressed container 102 via the redirect pointer; means for decompressing the accessed corresponding one of the plurality of files; and means for providing the decompressed corresponding one of the plurality of files to the application 112 without storing the decompressed corresponding one of the plurality of compressed files in persistent memory.

Another example contemplates the installation component 114 constituting means for accessing the compressed container 102 having a plurality of files, where the compressed container 102 is stored in the first portion 124 of memory; means for creating a plurality of the reference files 110 corresponding to the plurality of files in the compressed container 102, where the created plurality of the reference files 110 are stored in the second portion 126 of memory; and means for populating each of the created plurality of the reference files 110 with a redirect pointer to the corresponding one of the plurality of files in the compressed container 102. The filter component 116 constitutes means for receiving a request from the application 112 to access one of the plurality of the reference files 110; means for accessing, in response to the received request, the corresponding one of the plurality of files in the compressed container 102 via the redirect pointer; means for decompressing the accessed corresponding one of the plurality of files; and means for providing the decompressed corresponding one of the plurality of files to the application 112 without storing the decompressed corresponding one of the plurality of files in persistent memory.

While aspects of the disclosure have been described as implemented as a filter intercepting commands to a file system, other implementations are contemplated. For example, embodiments may be implemented in a kernel layer and/or in a new or custom file system format.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more computer storage media embodying computer-executable components, said components comprising:
   an installation component that causes at least one processor to:
      access a compressed container having a plurality of files, the compressed container being stored in a first portion of memory,
      create a plurality of reference files corresponding to the plurality of files in the compressed container, the created plurality of reference files being stored in a second portion of memory; and
   a filter component that causes said at least one processor to:
      receive a request from an application to access data represented by one of the plurality of reference files,
      in response to the received request, access the corresponding one of the plurality of files in the compressed container,
      decompress the accessed corresponding one of the plurality of files, and
      provide the decompressed corresponding one of the plurality of files to the application without storing the decompressed corresponding one of the plurality of files in persistent memory, wherein a validation of the provided corresponding one of the plurality of files is performed once per boot session and tracked with an in-memory bitmap.

2. The computer storage media of claim 1, wherein the installation component further copies the compressed container to a target volume, the compressed container being one of a plurality of compressed containers.

3. The computer storage media of claim 2, wherein the plurality of compressed containers include a first compressed container corresponding to an executing operating system and a second compressed container corresponding to customized applications and/or drivers.

4. The computer storage media of claim 1, wherein the filter component executes in a context of an executing operating system and the filter component is embodied in at least one of the following: software, firmware, or hardware.

5. The computer storage media of claim 1, further comprising wherein the installation component is further configured to populate the created plurality of reference files with a redirect pointers to the corresponding one of the plurality of files in the compressed container.

6. A method for dynamically redirecting data requests, said method comprising:
   detecting, by a computing device, a command to access a file in a second portion of storage;
   determining whether the command is associated with the file in the second portion of storage;
   on determining that the command is associated with the file in the second portion of storage, accessing a corresponding compressed version of the file, the corresponding compressed version of the file being stored within a compressed container in a first portion of storage;
   validating the file being stored within the compressed container once per boot session;
   tracking said validation of the file with an in-memory bitmap; and
   decompressing, by the computing device, at least a portion of the corresponding accessed compressed version of the file
   responding to the command with the decompressed portion of the corresponding accessed compressed version of the file without storing the decompressed portion in persistent storage.

7. The method of claim 6, further comprising:
   generating a trusted hash value for a plurality of sections of the compressed container;
   storing the generated, trusted hash values in a protected location;
   upon detecting the command, dynamically calculating a hash value for the corresponding compressed version of the file; and
   comparing the stored hash value, which is associated with the command, with the dynamically calculated hash value to determine validity.

8. The method of claim 6, wherein the command to access the file in the second portion of storage is associated with booting the computing device using the corresponding compressed version of the file.

9. The method of claim 6, wherein the first portion of storage and the second portion of storage reside in a same disk partition or different disk partitions.

10. The method of claim 6, wherein offline tampering of the compressed container is detected by:
    storing, in an extended attribute on the file in the second portion of storage, values for a file system journal identifier of a volume where the compressed container resides and a file system update sequence number identifier (USN ID) of the compressed container;
    upon detecting the command, reading values for the file system journal identifier and the USN ID for the compressed container and comparing the read values with the stored values in the extended attribute; and
    trusting the extended attribute based on the comparison.

11. The method of claim 6, wherein the compressed container includes an error correction code for performing error correction while accessing the corresponding compressed version of the file.

12. The method of claim 6, further comprising selecting one of a plurality of decompression algorithms based on a frequency of access of the corresponding compressed version of the file, and wherein the corresponding compressed version is decompressed using the selected one of the plurality of decompression algorithms.

13. The method of claim 6, wherein decompressing the corresponding version comprises decompressing the corresponding version by a plurality of processing cores in the computing device.

14. A system for accessing data within a compressed container, said system comprising:
    a memory area storing a compressed container of a plurality of files, the memory area further storing a plurality of reference files corresponding one of the plurality of files in the compressed container; and a processor programmed to:
- receive a request from an application to access one of the plurality of reference files;
- in response to the received request, access the corresponding one of the plurality of files in the compressed container;
- validate the file being stored within the compressed container once per boot session;
- track validation of the file with an in-memory bitmap;
- decompress the accessed corresponding one of the plurality of files; and
- provide the decompressed corresponding one of the plurality of files to the application without storing the decompressed corresponding one of the plurality of compressed files.

15. The system of claim 14, wherein the compressed container comprises at least one other compressed container.

16. The system of claim 14, wherein the compressed container includes a boot environment.

17. The system of claim 14, wherein the processor is programmed to receive the request by intercepting the request from a file system.

18. The system of claim 14, wherein the processor is further programmed to:
- receive a second request from the application to write data to said one of the plurality of reference files; and
- in response to the received second request, replacing a redirect pointer in said one of the plurality of reference files with the data.

19. The system of claim 14, wherein the processor is further programmed to:
- receive a second request from the application for accessing another one of the reference files, wherein the requested another one of the reference files stores an updated version of the corresponding one of the plurality of compressed files in the compressed container; and
- provide the requested another one of the reference files to the application without accessing the compressed container.

20. The system of claim 14, wherein a reparse point is associated with a redirect pointer of the accessed corresponding one of the plurality of files and the reparse point contains extended attributes of the corresponding one of the plurality of files in the compressed container.

* * * * *